United States Patent [19]
Chen

[11] Patent Number: 5,721,754
[45] Date of Patent: Feb. 24, 1998

[54] SIGNAL QUALITY DETECTOR AND METHODS THEREOF

[75] Inventor: Weizhong Chen, Keller, Tex.

[73] Assignee: Motorola, Inc., Schaumburg, Ill.

[21] Appl. No.: 646,803

[22] Filed: May 21, 1996

[51] Int. Cl.[6] .......................... H04B 17/00; H04L 27/14
[52] U.S. Cl. ................. 375/227; 375/334; 375/346; 455/67.3; 455/135
[58] Field of Search ............................. 375/224, 227, 375/316, 334, 346, 348; 455/67.1, 67.3, 135

[56] References Cited

U.S. PATENT DOCUMENTS

| | | | |
|---|---|---|---|
| 5,325,427 | 6/1994 | Dighe | 379/386 |
| 5,333,153 | 7/1994 | Brown et al. | 375/351 |
| 5,432,859 | 7/1995 | Yang et al. | 381/94 |
| 5,598,431 | 1/1997 | Lobel | 375/224 |
| 5,644,599 | 7/1997 | Hess | 375/267 |

*Primary Examiner*—Young T. Tse
*Attorney, Agent, or Firm*—Charles W. Bethards

[57] ABSTRACT

A signal quality detector (206) and analogous method thereof for operation on a signal having at least one predetermined frequency, the detector including a symbol detector (209), coupled to the signal, for providing a maximum discrete time Fourier transform value for a time period, the maximum discrete time Fourier transform value corresponding to one of the at least one predetermined frequency, an energy detector (217) for providing an energy estimate corresponding to a energy value of the signal over the time period, and a combinatorial logic (219) for combining the maximum discrete Fourier transform value and the energy estimate to provide a signal quality estimate or signal power or noise power.

24 Claims, 5 Drawing Sheets

SIGNAL QUALITY DETECTOR AND METHODS THEREOF

FIELD OF THE INVENTION

The present disclosure deals with signal quality detectors including but not limited to such detectors operable to estimate an accurate signal quality on a symbol by symbol basis.

BACKGROUND OF THE INVENTION

Generally signal quality detectors are known. Various forms of signal power estimators exist. It is known that signal to noise ratio (SNR) is one indication of signal quality.

However heretofore practitioners typically measured signal plus noise, as the noise could not be conveniently eliminated, and made the assumption that this quantity was a reasonable approximation for the signal power. Naturally this assumption is accurate only so long as the signal is large relative to the noise and becomes a progressively poorer estimate as the noise and signal approach similar orders of magnitude.

In any event, for practitioners to obtain an estimate of noise power required they either wait for or force a situation where the signal power approached zero. The inconvenience of this approach is clear and normally resulted in at best making noise estimates relatively infrequently. In addition to this inconvenience the inaccuracies associated with the signal power estimates tended to be largest just when the practitioner needed the highest degree of accuracy, specifically when the actual SNR was lowest.

Clearly a need exists for a signal quality detector or signal power detector and analogous methods that operate to produce reliable results in the concurrent presence of signal and noise.

BRIEF DESCRIPTION OF THE DRAWINGS

The features of the present invention that are believed to be novel are set forth with particularity in the appended claims. However, the invention together with further advantages thereof, may best be understood by reference to the accompanying drawings wherein:

DETAILED DESCRIPTION OF A PREFERRED EMBODIMENT

Generally the instant disclosure deals with a signal quality detector and analogous methods thereof that are arranged and constructed for operation on a signal, preferably a frequency shift keyed (FSK) signal but equally applicable to a phase shift keyed (PSK) signal having at least one predetermined frequency, preferably one predetermined frequency corresponding to each of four different symbols. Such detectors and methods may be advantageously utilized in various receivers in communications systems such as for example wireless messaging systems. The preferred form of the detector is substantially implemented within a digital signal processor (DSP) executing software that may readily be written by one of ordinary skill in the art given the principles herein disclosed. In the alternative the signal quality detector could easily be adapted to and implemented as one or more integrated circuits, such as semi-custom integrated circuits.

The signal quality detector includes apparatus, preferably a symbol detector, coupled to the signal, for providing a, preferably, maximum discrete time Fourier transform (DTFT) value for a, time period, preferably symbol time period, the maximum discrete time Fourier transform value corresponding to a predetermined frequency selected from the at least one predetermined frequency. A discrete Fourier transform (DFT) may be substituted for the preferred DTFT provided the actual corresponding frequency is well known in practice. Further included is an energy detector for providing an energy estimate corresponding to an energy value of the signal over the time period, and a combinatorial logic for combining the maximum discrete time Fourier transform value and the energy estimate to provide a signal quality estimate.

An analogous method of providing a signal quality estimate for a signal, preferably, frequency shift keyed (FSK) signal having at least one predetermined frequency includes the steps of; providing a maximum discrete time Fourier transform value for a time period, the maximum discrete time Fourier transform value corresponding to a predetermined frequency selected from the at least one predetermined frequency, providing an energy estimate corresponding to an energy value of the signal over the time period, and combining the maximum discrete time Fourier transform value and the energy estimate to provide a signal quality estimate or signal power or noise power estimate.

As an over view the instant disclosure discusses various techniques whereby known characteristics of a signal may be taken advantage of to concurrently estimate signal energy or power and noise energy or power. In the preferred embodiment where the signal energy is concentrated at one of a finite number of frequencies, preferably four, and the noise is uncorrelated or largely uncorrelated an accurate estimate of signal power, noise power and SNR may be obtained on a symbol by symbol basis. This capability is readily exploited in wireless messaging systems where the channel is subject to widely varying conditions at relatively frequent intervals.

Figure 1:
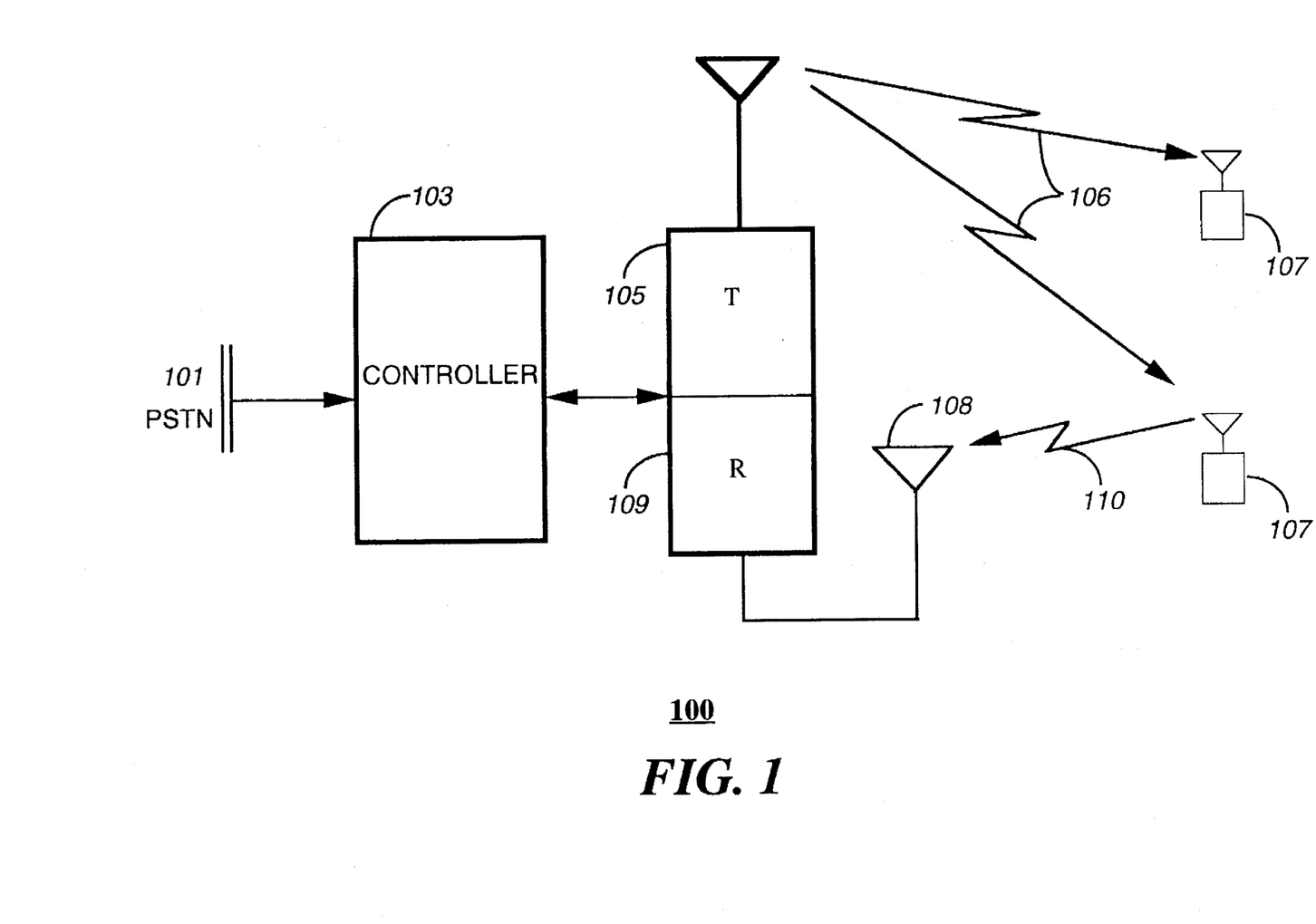
FIG. 1 is a block diagram of a selective messaging system suitable for employing an embodiment of the instant invention.

Referring to the figures for a better understanding of the inventive principles within the preferred embodiment of the instant invention and initially on a preferred setting, FIG. 1 depicts a selective messaging system (100) in overview block diagram format. The system includes a switch, terminal, or controller (103) coupled to a message source (101), such as the Public Switched Telephone Network. The controller (103) is coupled to a selective message transmitter system or base transmitter (105) and provides messages, such as paging messages, and control/scheduling information to this transmitter system.

Each base transmitter (one depicted) uses the control/scheduling information together with the messages to modulate a radio frequency carrier in accordance with a chosen modulation technique, such as preferably frequency shift keyed (FSK) modulation but equally applicable for phase shift keyed (PSK) modulation or quadrature amplitude modulation (QAM), and transmits the messages from an antenna, as a modulated radio frequency carrier, over a, preferably, wireless channel (106) to selective messaging units (107), such as paging message units (PMU) via their respective antennas. While the two PMUs are shown it is understood that a plurality of such units may exist in actual systems and that each base transmitter will be capable of delivering messages to many such PMUs.

The above description applies to so called one way selective messaging systems where messages are delivered from the base transmitters to the PMUs. In two way systems where messages may originate at the PMUs, either volitional or responsive to a message from the base transmitter, the messaging system will additionally have one or more base receivers (109). In such systems the PMUs (107) transmit a message, such as an acknowledgment (ACK) or status message from their respective antennas over their respective uplink wireless channels (110) to one or more of these base receivers (109) via their antenna (108). The receivers are coupled to the controller (103) as depicted and allow the controller (103) to provide the appropriate base transmitter with a non-acknowledgment (NACK) signal or the like under suitable circumstances not here germane.

It is noted that the selective messaging system (100) as depicted is merely an exemplary setting for the instant disclosure and serves to facilitate disclosure and in no way is intended to limit the true spirit and scope of the present invention. Actual systems may include significant additional base transmitters, PMUs, base receivers and may include an overlaying, perhaps satellite based system for maintaining a common time reference at each base transmitter for facilitating such functions as simulcasting a message from multiple base transmitters. The wireless channels (106) or uplink wireless channels (110) may be the same or different radio frequencies depending on the system design, or immediate objective. In any event the instant disclosure deals predominantly with inventive principles applicable, for example, to receivers such as found in the PMUs and preferably the base receiver (109) although these principles may find application in many fields including nearly all communications systems.

Figure 2:
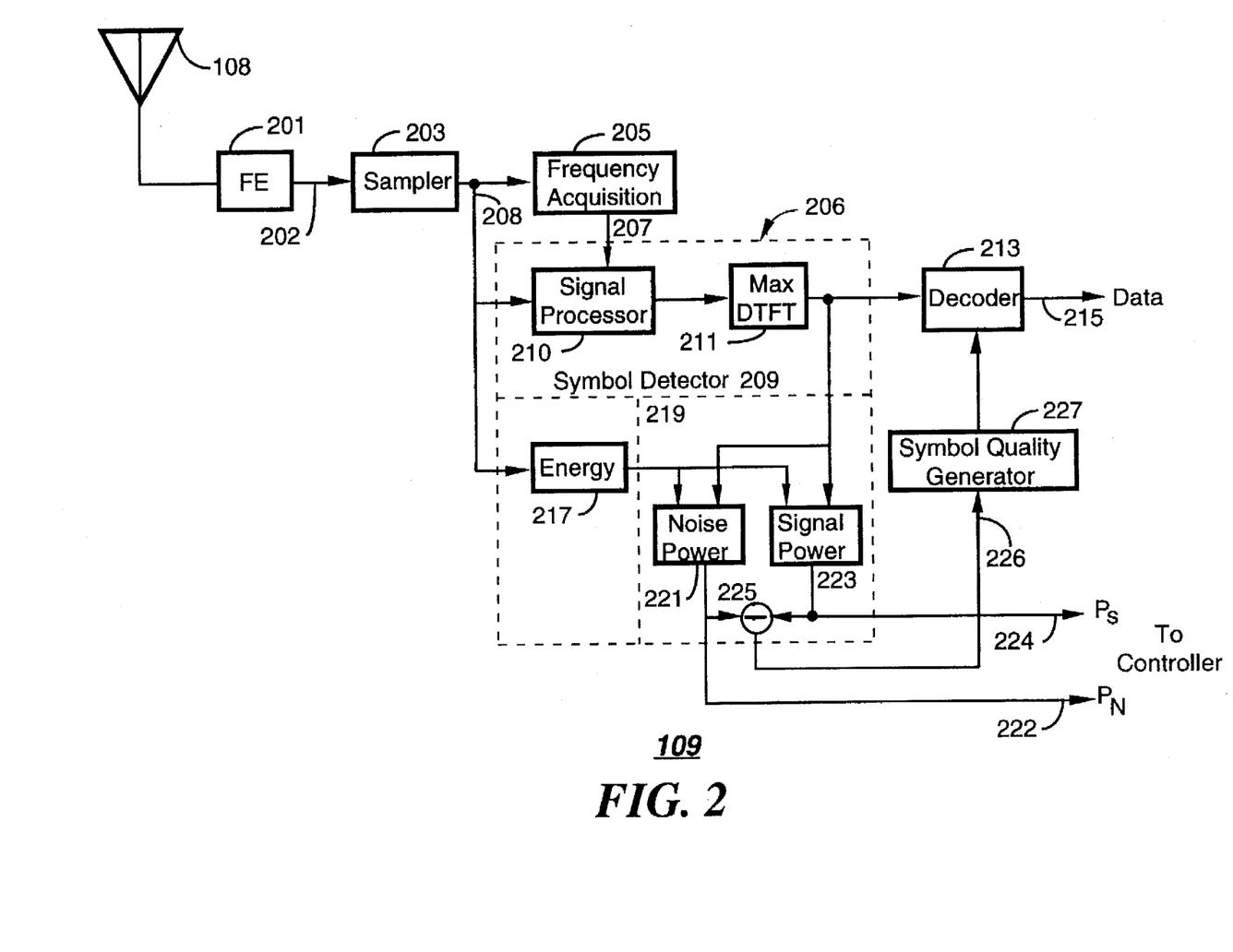
FIG. 2 is a more detailed block diagram of a receiver including a preferred embodiment of a signal quality detector suitable for use in the FIG. 1 messaging system.

Thus we focus on the more detailed FIG. 2 block diagram of the receiver (109) wherein like reference numerals refer to like entities. FIG. 2 depicts the antenna (108) coupled to a radio frequency front end (201) where messages from the uplink wireless channel (110) are amplified, filtered, mixed to a low frequency baseband signal, and then demodulated to form a baseband signal, at output (202), such as depicted in exemplary form in FIG. 4 all in accordance with approaches readily evident to one of ordinary skill in the art.

Figure 4:
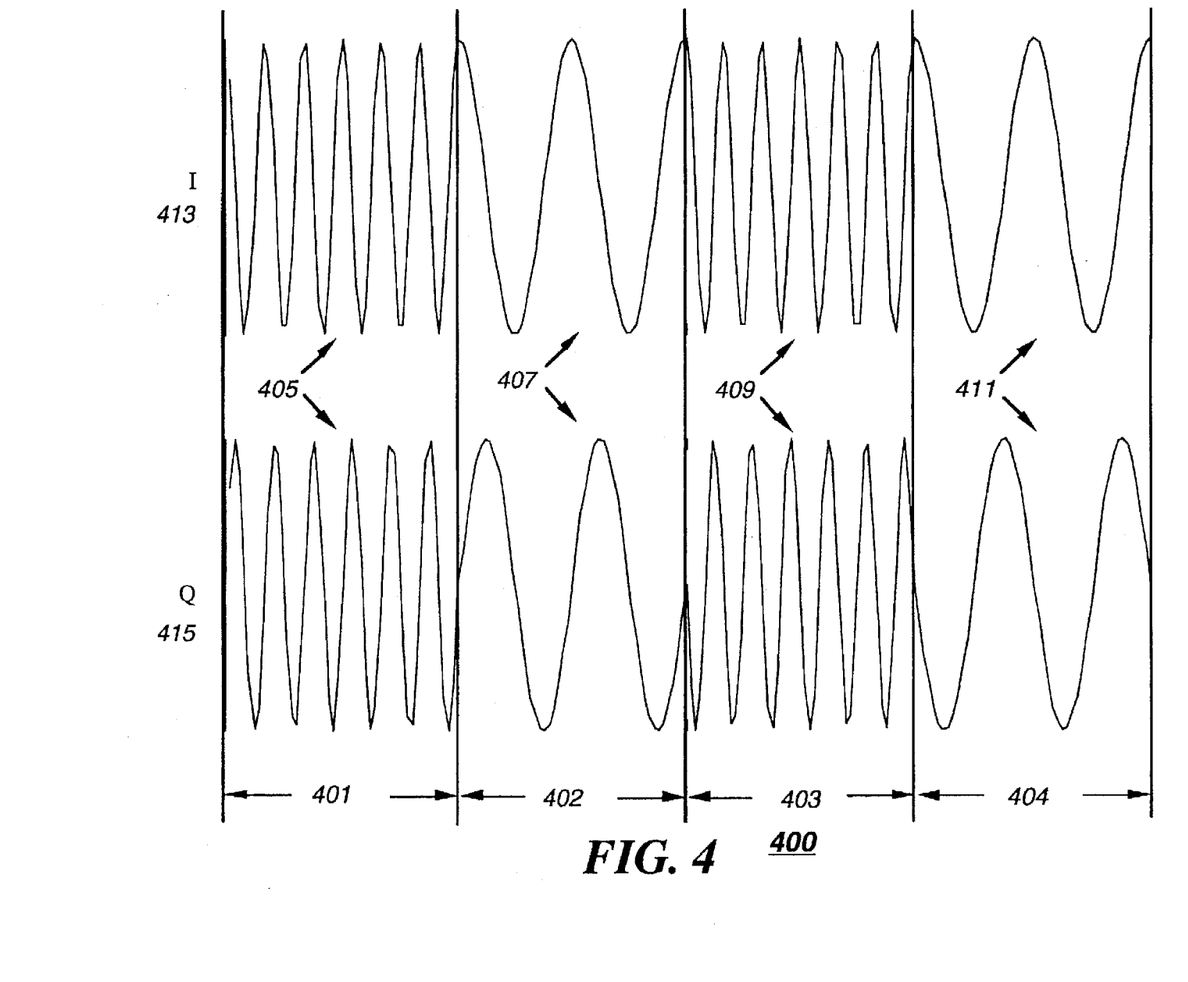
FIG. 4 is an exemplary signal diagram of an FSK baseband signal suited to understanding certain functions within FIG. 2 and FIG. 3.

The FIG. 4 signal depicts an exemplary baseband signal (400), including in phase (I) and quadrature (Q) components, that were FSK modulated with varying frequency signals representative of four possible symbols, specifically +/–2400 Hz and +/–800 Hz, in the preferred system. Four symbol time periods (401, 402, 403, 404) are shown with time period (401) occupied by a first signal having a first frequency (405), preferably +2400 Hz, representative of a first symbol. Similarly time period (402) is occupied by a second signal having a second frequency (407), preferably +800 Hz, representative of a second symbol. During symbol time period (403) the first frequency repeats but with the opposite sign or phase for the quadrature component yielding a negative frequency signal, that is preferably –2400 Hz and during symbol time (404) the second frequency similarly repeats with an opposite phase or preferably –800 Hz. Each symbol time period depicted in FIG. 4 as in the preferred embodiment is 2.5 milliseconds (ms) in duration. In an alternative preferred embodiment the time duration is 1.25 ms. These symbol time durations correspond, respectively, to a 400 or 800 symbol per second rate and, respectively, 800 and 1600 bits per second (bps) rate as the preferred system encodes 2 bits per symbol.

The output (202) with baseband signal (400) is coupled to a sampler (203) where the baseband signal, both the in phase (I) (413) or real and quadrature (Q) (415) or imaginary components is sampled or converted to a digital signal at the sampling rate of 20,000 times per second. Each sample of the I and Q component is converted by an analog to digital converter (not specifically shown) to a 16 bit digital word. At this sampling rate 50 samples are taken during each symbol time period shown in FIG. 4, thus 50 digital words are generated, or 25 samples for each period in the alternative 1600 bps embodiment. In any event the digital words, as sampled digital data $x_i(n)$, $x_q(n)$, are coupled, at output (208), to a frequency acquisition block (205) and a symbol quality detector (206), specifically a symbol detector (209) and an energy estimator (217).

Frequency acquisition block (205) operates to acquire the actual baseband carrier frequency or frequency error, depicted as 0 Hz in representative FIG. 4. In practical systems for various reasons the actual carrier frequency of the transmitted signal and the nominal carrier frequency of the transmitter or the carrier frequency of the transmitter as expected by the receiver will differ and this difference is known as the frequency error. This frequency error in practical receivers amounts to a frequency translation of the symbol frequencies, such as depicted in FIG. 4. Hypothetically, if the frequency error was 500 Hz, the symbols depicted in FIG. 4 would be demodulated or recovered as a +2900 Hz, +1300 Hz, –1900 Hz, and –300 Hz signal in, respectively, symbol times (401, 402, 403, 404).

The frequency acquisition block (205) selects, as corresponding to a frequency error, a maximum magnitude discrete time Fourier transform (DTFT) from a multiple point, preferably 67 point, DTFT that it calculates at frequencies uniformly spread, preferably every 30 Hz for a resolution of 15 Hz, over the range of possible frequencies that may be observed. In the preferred system this acquisition phase is set to operate during a silent carrier portion of the signal and this range is +/–1000 Hz or a 1000 Hz possible frequency error. After detecting the maximum magnitude DTFT the frequency error $\Delta f$, more specifically normalized frequency error $\Delta \omega = 2\pi \Delta f / f_s$, where $f_s$ is the sampling frequency, preferably 20,000 Hz, is obtained as the frequency corresponding to the maximum magnitude DTFT.

This frequency error is coupled to the signal quality detector (206), specifically the symbol detector (209) at output (207) and used in the process of symbol selection. This use and the process of symbol selection is further explained in a co-pending application Ser. No. 08/646,804, filed May 21, 1996, titled "A Signal Processor With Improved Efficiency" by Chen, having a like filing date, assigned to the same assignee as here and this application is hereby incorporated by reference.

The signal quality detector (206) discussed here, preferably operates on a frequency shift keyed (FSK) signal, such as depicted in FIG. 4, that has a plurality of predetermined frequencies, one each corresponding preferably to a possible symbol. This signal quality detector would function equally well on PSK signals and in fact could be simplified somewhat as normally a PSK signal has only one frequency of interest rather than one frequency for each symbol. In any event the signal quality detector includes the symbol detector (209) which is coupled to the sampled digital data, preferably, an FSK signal in a sampled data form at output (208), and operates to provide a maximum discrete time Fourier transform value for a time period, preferably symbol time period, the maximum discrete time Fourier transform value corresponding to a predetermined frequency selected from the at least one predetermined frequency or a plurality of predetermined frequencies.

The symbol detector (209) includes a signal processor (210) coupled to the sampled digital data and the processor in turn coupled to a magnitude selector (211). The signal processor operates as explained in the above referenced co-pending application to form DTFTs one each corresponding to each predetermined or symbol frequency. The magnitude selector operates preferably as a comparator, as well understood, to select the largest magnitude DTFT from among all DTFTs, preferably four, provided by the signal processor (210). The magnitude selector (211) provides the maximum discrete time Fourier transform value to a combinatorial logic (219) and a series of symbols, one for each symbol time period, or digital representations thereof to a decoder (213). The decoder then decodes these symbols in accordance with whatever over the air protocol is used as is well understood in the art, into a data or binary stream at output (215). As the details of over the air protocol and decoding are well understood in general and not further relevant to this disclosure no further space will be devoted to them.

Further included in the signal quality detector is an energy detector (217) for providing an energy estimate corresponding to an energy value of the signal or sampled data signal, preferably FSK signal over the time period or symbol time period, and the combinatorial logic (219) that operates to combine the maximum discrete time Fourier transform value and the energy estimate to provide a signal quality estimate at output (226). The combinatorial logic (219) includes a signal power detector (223) that provides an estimated signal power, preferably FSK signal power at output (224), over the time period or symbol time period and a noise power detector (221) for providing an estimated noise power, at output (222) over the time period. Both are coupled to the energy estimate and the maximum discrete time Fourier transform, and both couple their respective power estimates to divider (225) where a corresponding signal to noise ratio (SNR) is formed.

The outputs (222, 224) are destined for a system controller and used, for example, for directed message delivery routing. The signal power estimate at output (224) is a good indication of, for example, relative proximity of a PMU to the receiver (109) while the noise power estimate at output (222) is a good indication of local interference for transmissions from a PMU. Together these two concurrently found or obtained but independent powers may be advantageously used to significantly improve frequency reuse and hence messaging system capacity or throughput.

The signal quality estimate or SNR is coupled to a symbol quality generator (227) where a prioritized list of symbol locations is generated and coupled to the decoder (213) all as explained in co-pending application Ser. No. 08/646,805, filed May 21, 1996, titled "An Adaptive Reed-Solomon Decoder And Methods Thereof" by Chen and Sammartino, having a like filing date, assigned to the same assignee and hereby incorporated by reference.

Figure 3:
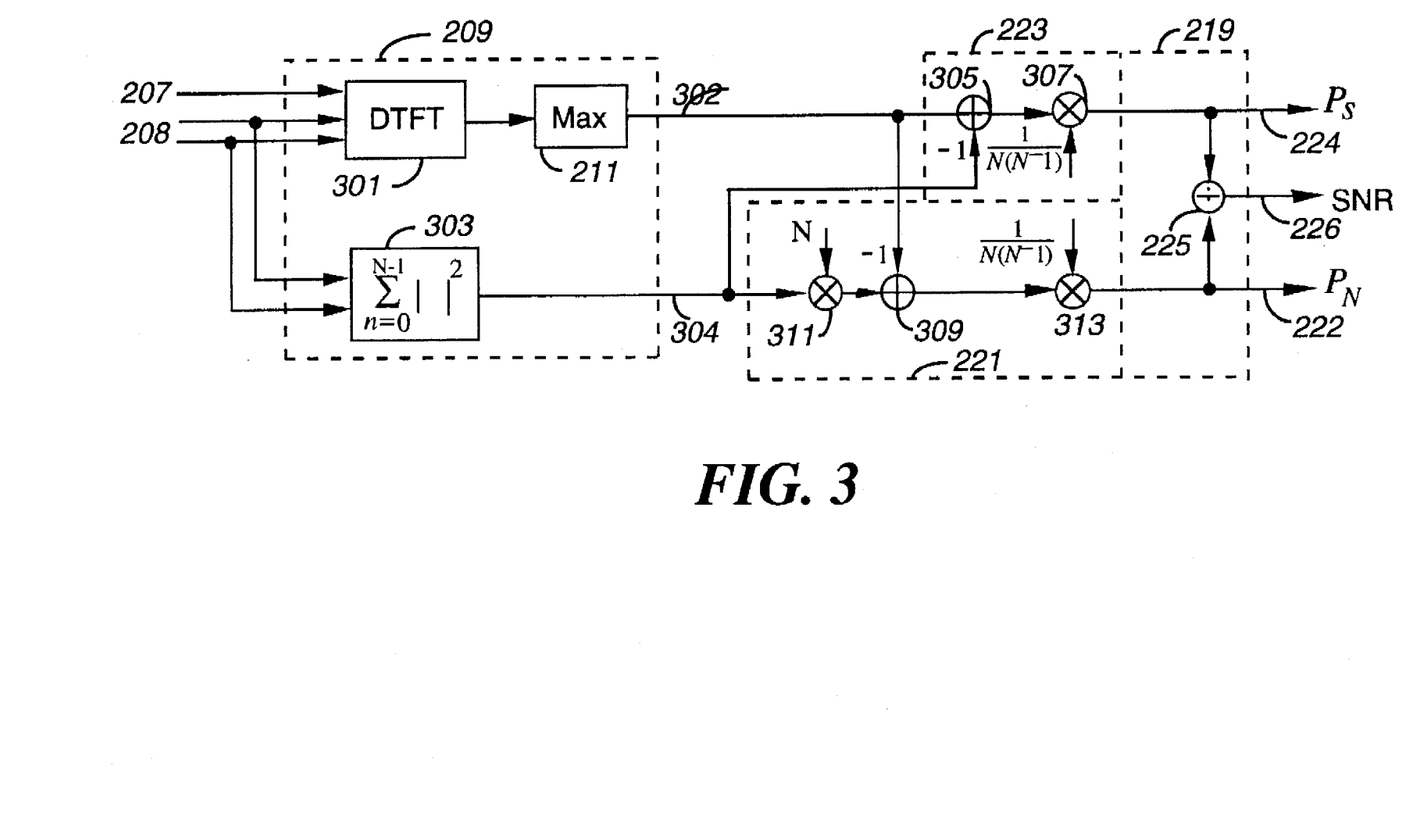
FIG. 3 is a more detailed block diagram of the FIG. 2 embodiment of the signal quality detector.

Referring to FIG. 3 where like elements from FIG. 2 have like reference numerals, a more detailed block diagram of the signal quality detector (206) is depicted. The sample digital data at output (208) is coupled to the symbol detector (209), specifically a preferred form of the signal processor namely a DTFT engine (301) that is then coupled to the magnitude selector (211). From below the output (302) from the magnitude selector may be shown to be the peak value of the signal, $PV_X = N^2 P_S + NP_N$, where $P_S$ and $P_N$ are, respectively, signal power and noise power. Additionally the sampled digital data is coupled to the energy detector (217) that in a preferred summer form (303) squares each sample of the sampled data FSK signal over the symbol time period to provide squared samples and forms a summation of the squared samples to provide the energy estimate. From below this may be shown to be equal to $E_T = NP_N + NP_S$ or the total energy in the symbol time period.

Before discussing the specifics of the combinatorial logic (219) a review of the mathematical basis of the signal quality detector is appropriate. Suppose a received digital signal of an M-ary FSK channel within one symbol slot is $$x(n) = x_S(n) + x_N(n), \quad n = 0, 1, \ldots, N-1, \tag{1}$$

where $x_N(n)$ is white Gaussian noise, and $x_S(n)$ is the message signal, which can be represented by $$x_S(n) = A_S e^{j 2\pi f_m n \Delta t}, \quad n = 0, 1, \ldots, N-1, \tag{2}$$

where $\Delta t$ is the time domain sampling interval or $1/f_S = 1/20{,}000$, N $\Delta t$ is the symbol period, preferably equal to 2.5 ms, and $f_m$ is one of the M frequencies, such as ±2400 or ±800 Hz assigned for the M-ary FSK modulation. Then the task is to estimate or predict:

a) the message signal power $$P_S = A_S^2 = \frac{1}{N} \sum_{n=0}^{N-1} |x_S(n)|^2, \tag{3}$$

b) average noise power $$P_N = E\left[\frac{1}{N} \sum_{n=0}^{N-1} |x_N(n)|^2\right], \tag{4}$$

and a signal quality level or Signal to Noise Ratio $$SNR = \frac{P_S}{P_N} \tag{5}$$

from the received digital signal x(n), where E[.] denotes mean or expectation.

The following gives the detailed derivation of an approach to estimate $P_S$ and $P_N$. Suppose, as is reasonable, the message signal $x_S(n)$ and noise $x_N(n)$ are uncorrelated, then the total energy $E_T$ of x(n) over a symbol slot is the sum of the noise energy $E_N$ and the message signal energy $E_S$ over the symbol slot. This can be represented by $$E_T = E_S + E_N, \tag{6}$$

where $$E_T = E\left[\sum_{n=0}^{N-1} |x(n)|^2\right], \tag{7}$$

$$E_S = \sum_{n=0}^{N-1} |x_S(n)|^2, \tag{8}$$

-continued and $$E_N = E\left[\sum_{n=0}^{N-1} |x_N(n)|^2\right]. \tag{9}$$

Therefore $$E_T = NP_N + NP_S \tag{10}$$

Now the DTFT(Discrete Time Fourier Transform) of x(n) on the M assigned symbol frequencies, $f_k$, k=1, 2, ..., M, is defined as and can be calculated by $$X(f_k) = \sum_{n=0}^{N-1} x(n) e^{-j2\pi f_k n \Delta t}, k=1,\ldots,M, \tag{11}$$

and $$X(f_k) = X_S(f_k) + X_N(f_k), k=1,\ldots,M, \tag{12}$$

where $X_S(f_k)$ is the DTFT of $x_S(n)$, and $X_N(f_k)$ is the DTFT of $x_N(n)$ at the M assigned symbol frequencies.

Suppose the message frequency on a symbol slot is $f_m$, the peak value $PV_S$ of $|X_S(f_k)|^2$, k=1, ..., M, will be at $f_k = f_m$, and $$PV_S = |X_S(k_m)|^2 = \sum_{n=0}^{N-1} |A_S|^2 = N^2 A_S^2 = N^2 P_S. \tag{13}$$

Since $x_N(n)$ is white Gaussian noise, it is easy to prove that $$E[|X_N(f_m)|^2] = E_N = NP_N. \tag{14}$$

Suppose the peak value $PV_X$ of $|X(f_k)|^2$, k=1, ..., M, is co-located with the peak $PV_S$ of $|X_S(f_k)|^2$ at $f_k = f_m$, and since $X_N(f_k)$ and $X_S(f_k)$ are uncorrelated, then from Equation (12), $$\begin{aligned}E[PV_X] &= E[|X(f_m)|^2] = |X_S(f_m)|^2 + E[|X_N(f_m)|^2] \\ &= N^2 P_S + NP_N\end{aligned} \tag{15}$$

Equations (10) and (15) then yield the following $$P_S = \frac{1}{N(N-1)}\{E[PV_X] - E_T\}, \tag{16}$$

and $$P_N = \frac{1}{N(N-1)}\{NE_T - E[PV_X]\}. \tag{17}$$

Therefore $$SNR = \frac{E[PV_X] - E_T}{NE_T - E[PV_X]} \tag{18}$$

where $E[PV_X]$ is the expectation of the maximum of $|X(f_k)|^2$, k=1, 2, ..., M, and $E_T$ is given by (7).

From this in operation $P_N$ and $P_S$ and SNR can be estimated $$\overline{P_S} = \frac{1}{N(N-1)}\{\overline{PV_X} - \overline{E_T}\}, \tag{19}$$

$$\overline{P_N} = \frac{1}{N(N-1)}\{N\overline{E_T} - \overline{PV_X}\}, \tag{20}$$

$$\overline{SNR} = \frac{\overline{PV_X} - \overline{E_T}}{N\overline{E_T} - \overline{PV_X}} \tag{21}$$

where $\overline{P_S}$, $\overline{P_N}$ and $\overline{SNR}$ are the estimates of $P_S$, $P_N$ and SNR respectively, and $\overline{PV_X}$ and $\overline{E_T}$ are the estimates of $E[PV_X]$ and $E_T$ respectively. From Equation (15), $E[PV_X]$ can be estimated by the maximum of $|X(k)|^2$, k=1, ..., M. Since $\overline{PV_X}$ is a by-product of symbol recovery, therefore the estimation of $\overline{P_S}$, $\overline{P_N}$ and $\overline{SNR}$ is very efficient. From Equation (7), $E_T$ can be estimated by $$\overline{E_T} = \sum_{n=0}^{N-1} |x(n)|^2 \tag{22}$$

Equations (19), (20) and (21) give the estimation of $P_S$, $P_N$ and SNR on a symbol by symbol basis and are readily extended to a packet by packet basis if desired.

Referring again to FIG. 3 the outputs (302, 304) with their respective signals are both coupled to the signal and noise power detectors, respectively (223, 221). The signal power detector includes an adder (305) that provides an output that is proportional to an estimated signal power, preferably, FSK signal power. This estimated FSK signal power, given the polarities indicated, corresponds to a difference between the maximum discrete time Fourier transform value, $PV_X$ and the summation of the squared samples, $E_T$. The output from adder (305) is coupled to a multiplier and weighted by 1/N(N-1) to yield $P_S$, the signal power.

The noise power detector (221) provides an estimated noise power over the symbol time period. A multiplier (311) first weights $E_T$ by N to provide $NE_T$ to adder (309). Adder (309) provides an output that is proportional to an estimated noise power that corresponds to a difference between the summation of the squared samples, $E_T$, weighted by the number of samples, N, or $NE_T$ during the symbol time period and the maximum discrete time Fourier transform value, $PV_X$. This output is coupled to a multiplier (313) and weighted by 1/N(N-1) to yield $P_N$, the noise power. As above noted the signal power detector and noise power detector outputs, respectively, $P_S$ and $P_N$ are coupled to a divider (225) that provides a signal quality estimate, specifically SNR, at (226). The outputs of adders (305, 309) may be directly divided to form the SNR, thus saving a couple of multiply operations if only the SNR is desired.

The signal quality detector, as earlier noted, may be substantially embodied in one or more integrated circuits or as a digital signal processor executing software readily written to perform the above operations by one of ordinary skill in that art. In operation a method, depicted in flow chart form in FIG. 5, of providing a noise power or signal power, or a signal quality estimate for a signal having at least one predetermined frequency is practiced. The method begins at (501) and at step (503) a signal is received after which at step (505) the signal is sampled to provide a sampled data, preferably FSK, signal.

Figure 5:
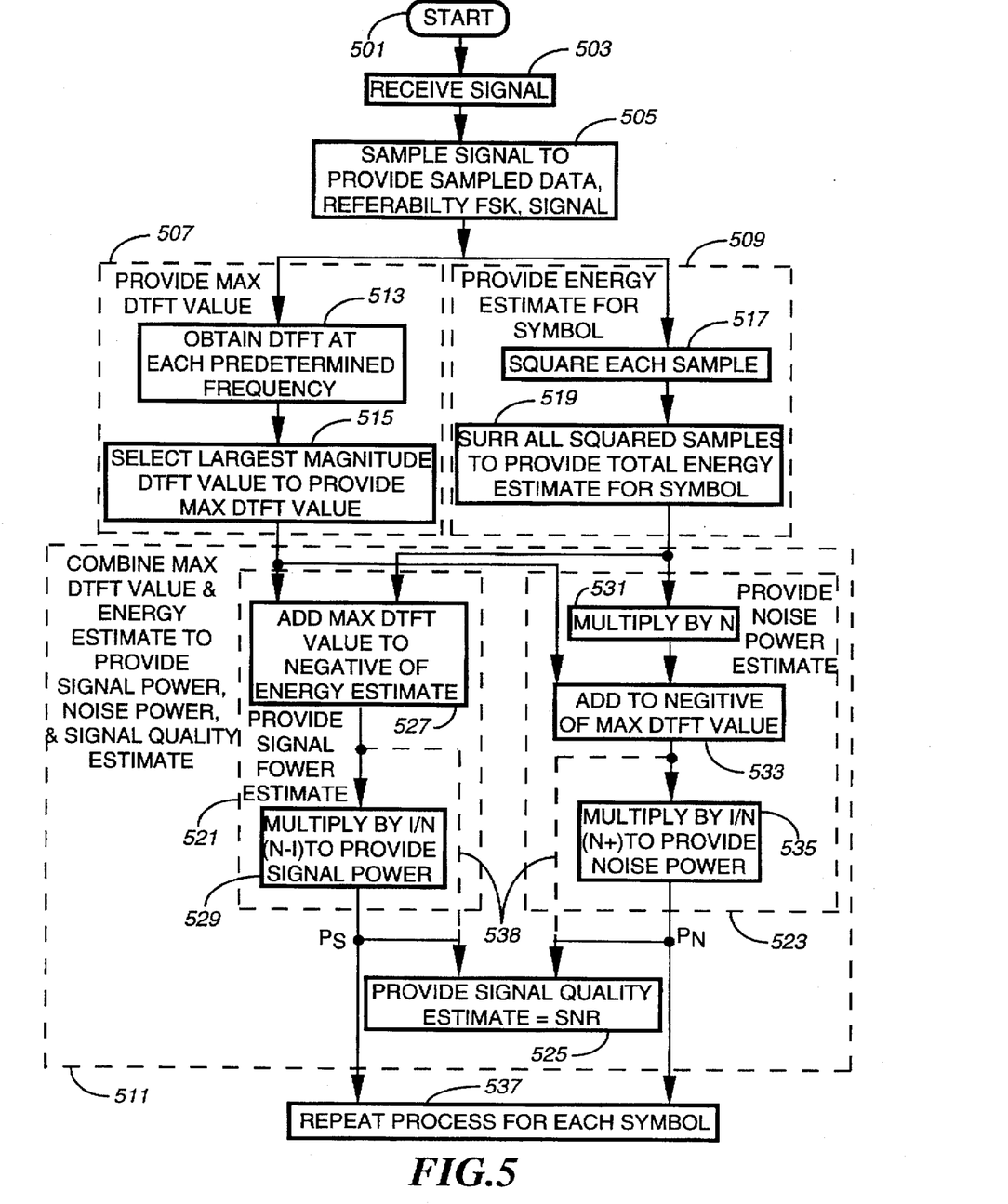
FIG. 5 is a flow chart of a preferred embodiment of a method of providing a signal quality estimate.

The signal as sampled is used at step (507) to provide a maximum DTFT value for a time period, preferably symbol time period. This maximum DTFT value corresponds to a predetermined frequency selected from the at least one predetermined frequency. More specifically step (507 includes a step (513) of obtaining or providing a DTFT at each of the predetermined frequencies and a step (515) directed to selecting the largest magnitude DTFT value to provide the maximum DTFT value.

The sampled signal from step (505) is further used by step (509) to provide an energy estimate corresponding to a energy value of the signal over the, preferably symbol, time period. Step (509) includes step (517) that provides a square of each sample of the sampled data, preferably FSK, signal over the symbol time period yielding squared samples and further includes a step (519) of forming a summation of the squared samples to provide the energy estimate for the signal over the time period, preferably symbol time period.

Then at step (511) combining the maximum discrete time Fourier transform value and the energy estimate to provide a signal power, a noise power, and a signal quality estimate is undertaken. Included in step (511) is step (521) directed to providing an estimated, preferably FSK, signal power over the time period, step (523) directed to providing an estimated noise power over the time period, and step (525) directed to providing an estimated signal to noise ratio corresponding to the estimated, preferably FSK, signal power and the estimated noise power.

Step (521) includes step (527) where the maximum DTFT value is added to the negative of the energy estimate to provide an estimated, preferably FSK, signal power over the symbol time period that corresponds to a difference between the maximum DTFT value and the summation of the squared samples. Step (529) multiplies this result by 1/N(N-1) to provide the signal power estimate. Step (523) includes step (531) where the energy estimate is weighted or multiplied by N and then step (533) adds the negative of the maximum DTFT value to provide a signal proportional to an estimated noise power over the symbol time period, where the estimated noise power corresponds to a difference between the summation of the squared samples weighted by a number of samples, N, during the symbol time period and the maximum discrete time Fourier transform value. This result is weighted or multiplied at step (535) by 1/N(N-1) to provide the estimated noise power. Optionally as indicated by the dashed lines (538) step (525) may operate responsive to steps (527, 533) thereby skipping steps (529, 535) when only a signal quality estimate or SNR is required. In any event the process of FIG. 5 is repeated for each symbol as indicated by (537).

It will be appreciated by those of ordinary skill in the art that the apparatus and methods disclosed provide various approaches for determining a signal power, noise power, or signal quality estimate concurrently on a symbol by symbol or packet by packet basis without compromising any signal or system characteristics or otherwise un-necessarily burdening processing resources. These inventive structures and methods may be readily and advantageously employed in a wireless selective messaging system, base receiver or other communications receiver or system to provide a signal quality predictor or signal power estimate a corresponding method of detecting signal quality. Hence, the present invention, in furtherance of satisfying a long-felt need of wireless communications, readily facilitates, for example, systems, receivers, decoders, and the like that require accurate and current signal or noise power information. Such information may by advantageously used to provide greater accuracy in error correction for decoders or greater system capacity by facilitating, for example, accurate directed message delivery.

It will be apparent to those skilled in the art that the disclosed invention may be modified in numerous ways and may assume many embodiments other than the preferred forms specifically set out and described above. For example many of the inventive procedures and apparatus described in a preferred form for FSK systems will work equally well for PSK systems, for example. Accordingly, it is intended by the appended claims to cover all modifications of the invention which fall within the true spirit and scope of the invention.

What is claimed is:

1. A signal quality detector for operation on a signal having at least one predetermined frequency, the detector comprising in combination:

a symbol detector, coupled to the signal, for providing a maximum discrete time Fourier transform value for a time period, said maximum discrete time Fourier transform value corresponding to a predetermined frequency selected from the at least one predetermined frequency;

an energy detector for providing an energy estimate corresponding to an energy value of said signal over said time period, and a combinatorial logic for combining said maximum discrete Fourier transform value and said energy estimate to provide a signal quality estimate.

2. The signal quality detector of claim 1 wherein said combinatorial logic further includes a signal power detector for providing an estimated signal power over said time period.

3. The signal quality detector of claim 2 wherein said combinatorial logic further includes a noise power detector for providing an estimated noise power over said time period.

4. The signal quality detector of claim 3 wherein said combinatorial logic further provides an estimated signal to noise ratio corresponding to said estimated signal power and said estimated noise power.

5. The signal quality detector of claim 1 further arranged and constructed to operate on a sampled data FSK signal wherein said time period corresponds to a symbol time period.

6. The signal quality detector of claim 5 wherein said combinatorial logic further includes a signal power detector for providing an estimated FSK signal power over said symbol time period.

7. The signal quality detector of claim 6 wherein said combinatorial logic further includes a noise power detector for providing an estimated noise power over said symbol time period.

8. The signal quality detector of claim 7 wherein said combinatorial logic further provides an estimated signal to noise ratio corresponding to said estimated FSK signal power and said estimated noise power.

9. The signal quality detector of claim 5 wherein said energy detector squares each sample of said sampled data FSK signal over said symbol time period to provide squared samples and forms a summation of said squared samples to provide said energy estimate.

10. The signal quality detector of claim 9 wherein said combinatorial logic further includes a signal power detector for providing an estimated FSK signal power over said symbol time period, said estimated FSK signal power corresponding to a difference between said maximum discrete time Fourier transform value and said summation of said squared samples.

11. The signal quality detector of claim 9 wherein said combinatorial logic further includes a noise power detector for providing an estimated noise power over said symbol time period, said estimated noise power corresponding to a difference between said summation of said squared samples weighted by a number of samples during said symbol time period and said maximum discrete time Fourier transform value.

12. The signal quality detector of claim 1 further substantially embodied in a digital signal processor.

13. The signal quality detector of claim 1 further substantially embodied in an integrated circuit.

14. A method of providing a signal quality estimate for a signal having at least one predetermined frequency, the method including the steps of;

providing a maximum discrete time Fourier transform value for a time period, said maximum discrete time Fourier transform value corresponding to a predetermined frequency selected from the at least one predetermined frequency;

providing an energy estimate corresponding to an energy value of said signal over said time period, and combining said maximum discrete time Fourier transform value and said energy estimate to provide said signal quality estimate.

15. The method of claim 14 wherein said step of combining further includes a step of providing an estimated signal power over said time period.

16. The method of claim 15 wherein said step of combining further includes a step of providing an estimated noise power over said time period.

17. The method of claim 16 wherein said step of combining further provides an estimated signal to noise ratio corresponding to said estimated signal power and said estimated noise power.

18. The method of claim 14 further arranged to operate on a sampled data FSK signal wherein said time period corresponds to a symbol time period.

19. The method of claim 18 wherein said step of combining further includes a step of providing an estimated FSK signal power over said symbol time period.

20. The method of claim 19 wherein said step of combining further includes a step of providing an estimated noise power over said symbol time period.

21. The method of claim 20 wherein said step of combining further provides an estimated signal to noise ratio corresponding to said estimated FSK signal power and said estimated noise power.

22. The method of claim 18 wherein said step of providing said energy estimate further squares each sample of said sampled data FSK signal over said symbol time period to provide squared samples and further includes a step of forming a summation of said squared samples to provide said energy estimate.

23. The method of claim 22 wherein said step of combining further includes a step of providing an estimated FSK signal power over said symbol time period, said estimated FSK signal power corresponding to a difference between said maximum discrete time Fourier transform value and said summation of said squared samples.

24. The method of claim 22 wherein said step of combining further includes a step of providing an estimated noise power over said symbol time period, said estimated noise power corresponding to a difference between said summation of said squared samples weighted by a number of samples during said symbol time period and said maximum discrete time Fourier transform value.

* * * * *